United States Patent
Martinez et al.

(10) Patent No.: US 8,286,093 B2
(45) Date of Patent: Oct. 9, 2012

(54) REPLACEMENT MOTHERBOARD CONFIGURATION

(75) Inventors: Ricardo L. Martinez, Austin, TX (US); Aaron Taylor, Round Rock, TX (US); Richard Brian Wallace, Pflugerville, TX (US); Joshua N. Alperin, Round Rock, TX (US); Charles Marion Ueltschey, III, Austin, TX (US)

(73) Assignee: Dell Products L.P.

( * ) Notice: Subject to any disclaimer, the term of this patent is extended or adjusted under 35 U.S.C. 154(b) by 1256 days.

(21) Appl. No.: 11/971,490

(22) Filed: Jan. 9, 2008

(65) Prior Publication Data
US 2009/0177999 A1    Jul. 9, 2009

(51) Int. Cl.
*G06F 3/048* (2006.01)
*G06F 3/00* (2006.01)
*G06F 9/00* (2006.01)

(52) U.S. Cl. .............. 715/810; 710/104; 713/2
(58) Field of Classification Search .......... 715/810, 715/764, 827, 832, 965, 966
See application file for complete search history.

(56) References Cited

U.S. PATENT DOCUMENTS

| | | | |
|---|---|---|---|
| 7,363,392 B2* | 4/2008 | Thomas | 710/8 |
| 2002/0133471 A1* | 9/2002 | Eskandari et al. | 705/401 |
| 2003/0236971 A1* | 12/2003 | Rothman et al. | 713/1 |
| 2004/0230788 A1* | 11/2004 | Zimmer et al. | 713/2 |
| 2004/0255286 A1* | 12/2004 | Rothman et al. | 717/168 |
| 2005/0047594 A1* | 3/2005 | Cho et al. | 380/59 |
| 2005/0114687 A1* | 5/2005 | Zimmer et al. | 713/193 |
| 2006/0004928 A1* | 1/2006 | Hess et al. | 710/8 |
| 2006/0074952 A1* | 4/2006 | Rothman et al. | 707/101 |
| 2009/0094421 A1* | 4/2009 | Lewis | 711/154 |

FOREIGN PATENT DOCUMENTS
WO    WO 2007097700 A2 *   8/2007

OTHER PUBLICATIONS

Extensible Firmware Interface Specification. Version 1.10. Dec. 1, 2002.*

* cited by examiner

*Primary Examiner* — Weilun Lo
*Assistant Examiner* — Amy M Levy
(74) *Attorney, Agent, or Firm* — Haynes and Boone, LLP

(57) ABSTRACT

In a system to configure a replacement motherboard, one or more subsystems are provided to determine whether the replacement motherboard is in a manufacturing mode, determine whether firmware for the replacement motherboard is unlocked, and receive an input from a user to configure the replacement motherboard when the replacement motherboard is determined to be in the manufacturing mode and the firmware is unlocked.

21 Claims, 2 Drawing Sheets

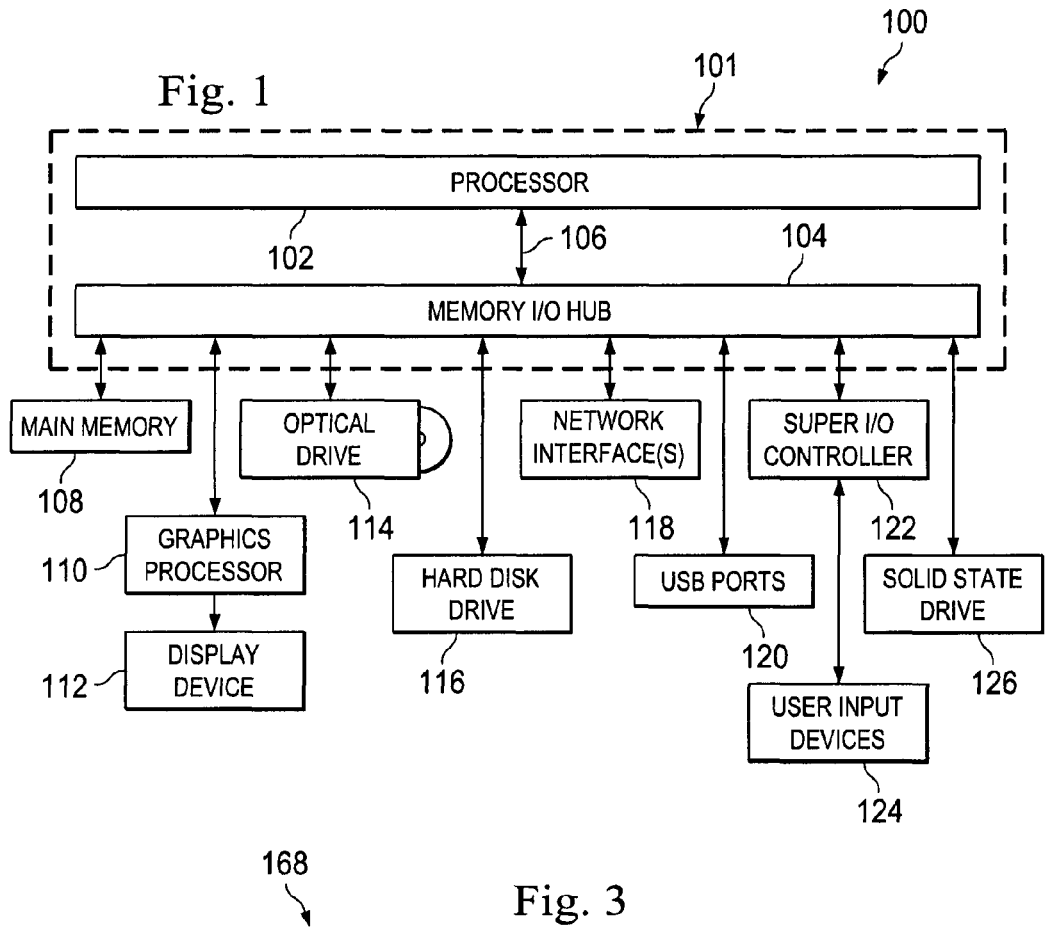
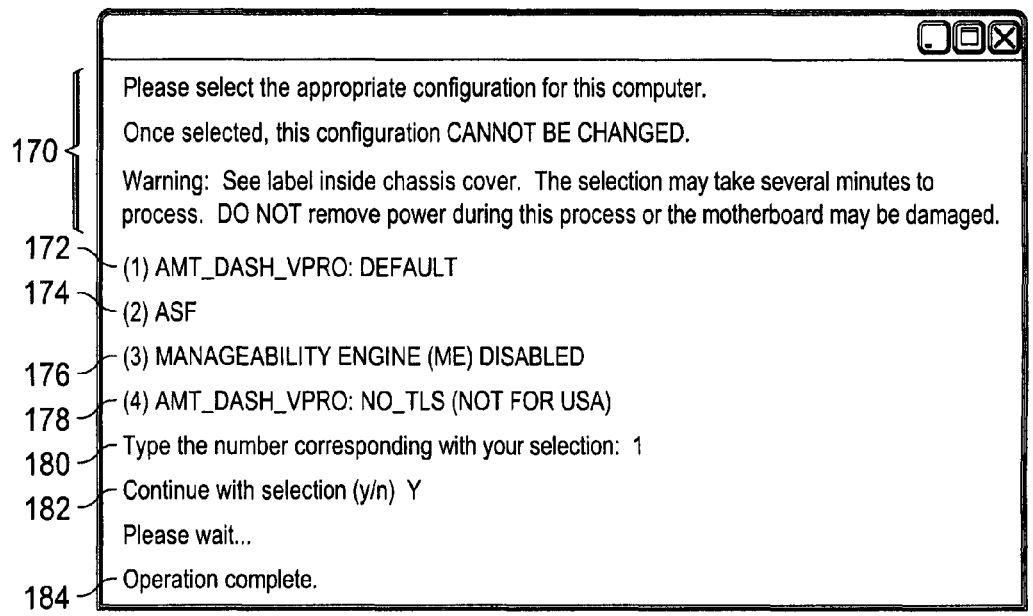

REPLACEMENT MOTHERBOARD CONFIGURATION

BACKGROUND

The present disclosure relates generally to information handling systems, and more particularly to a replacement motherboard configuration system and method.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

It is well known in the art that IHSs generally have a primary printed circuit board known as a motherboard to provide electrical and logical connections for components of the IHS, to process information, and to communicate among various components of the IHS and outside of the IHS. A typical motherboard includes a processor (and/or a processor socket), a memory I/O hub, connection sockets, and/or a variety of other devices. Before an IHS is shipped from a factory, the motherboard is generally configured using software or firmware allowing the motherboard to operate in a specific way. For example, IHSs destined for certain countries are not configured to process information using certain encryption modes, while other IHSs using the same or similar motherboard destined for different countries may be configured to operate using the encryption modes.

Unfortunately, the motherboards occasionally need to be replaced due to part failure or other reasons. Suppliers of replacement motherboards generally want to stock the replacement motherboards unconfigured (e.g., configured after leaving the supplier to match the configuration of the original motherboard) so that the supplier does not have to stock different motherboards for all of the different configurations available. Thus, replacement motherboards are generally configured after being received at the location of the IHS customer.

When the IHS is new at the factory, the motherboard is configurable using hardware and software tools in the factory. These tools use an interface to modify specific offsets within a manageability engine firmware region to change settings. Some configurations may cost the customer extra when they are selected. In some instances, manufacturers have simplified the possible configuration options into several identifiable stock keeping units (SKUs) for customers. In other instances, there may be many more configurations available. These SKUs are selectable for the motherboard when a customer orders an IHS. This flexibility for the customer becomes difficult for the suppliers of replacement motherboards because the only way to distinguish dispatched replacement motherboards is by part number and certain motherboards have the same part number, even if the manageability engine is configured to a different SKU when the original motherboard was shipped to the customer. A supplier of replacement motherboards may not "touch" the replacement motherboards to configure them prior to arriving at the customer location. Therefore, without a solution, the customer may receive a replacement motherboard that does not behave the same as the board that it replaced. To allow the customer to configure the motherboard after receiving the replacement motherboard IHS manufacturers may supply a compact disk (CD) with every replacement motherboard. This CD boots and configures the system to match the replaced motherboard. However, this is expensive, may be misapplied by the customer, and the CD may be misplaced.

Accordingly, it would be desirable to provide an improved replacement motherboard configuration system and method, absent the deficiencies discussed above.

SUMMARY

According to one embodiment, a system to configure a replacement motherboard includes one or more subsystems to determine whether the replacement motherboard is in a manufacturing mode, determine whether firmware for the replacement motherboard is unlocked, and receive an input from a user to configure the replacement motherboard when the replacement motherboard is determined to be in the manufacturing mode and the firmware is unlocked.

BRIEF DESCRIPTION OF THE DRAWINGS

FIG. 1 illustrates an embodiment of an IHS.

FIG. 3 illustrates a screenshot of an embodiment of a configuration menu to facilitate configuration of a replacement motherboard.

DETAILED DESCRIPTION

Figure 2:
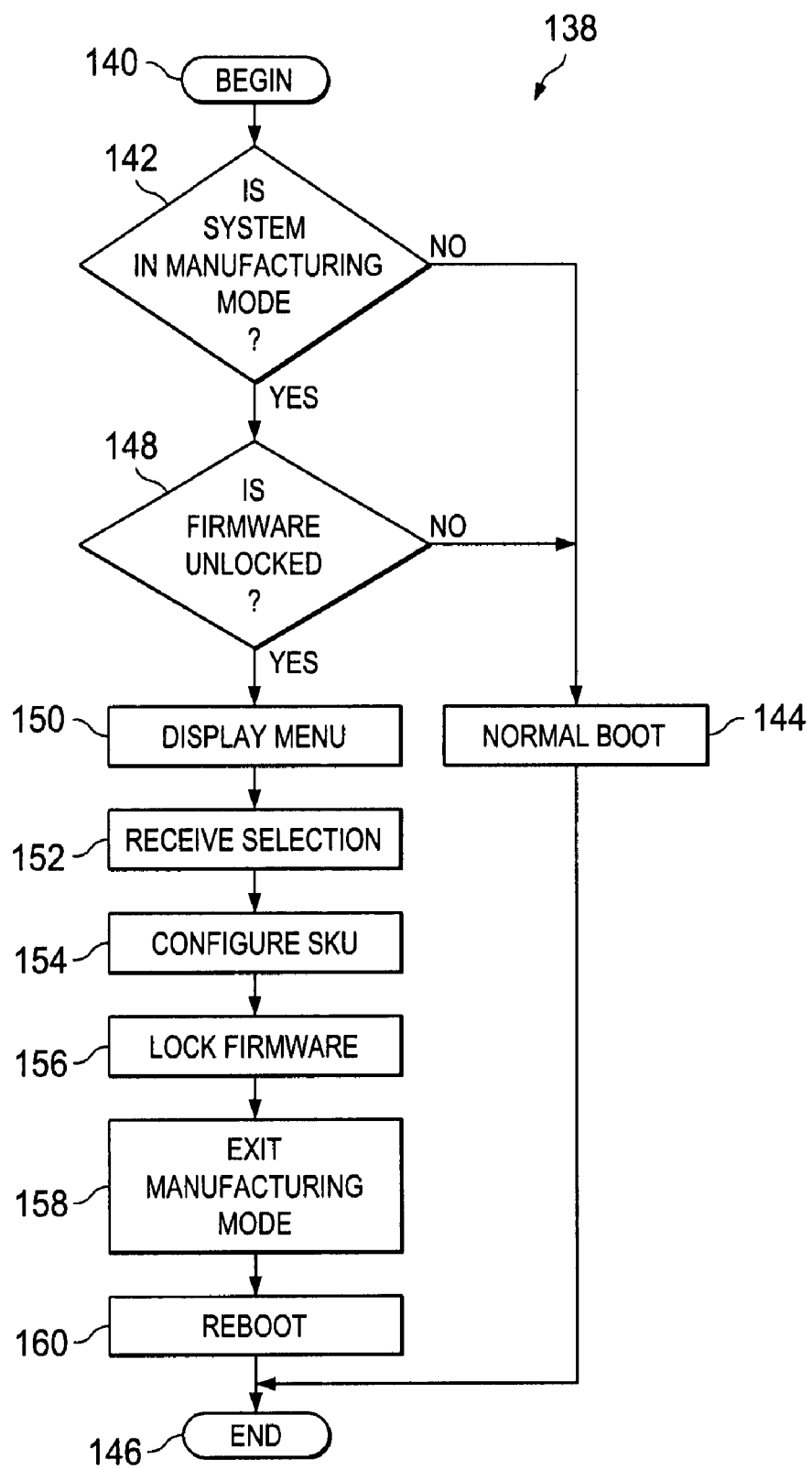
FIG. 2 is a flow chart illustrating an embodiment of a method for configuring a replacement motherboard.

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112. In an embodiment, the processor 102, the memory I/O hub 104, and the front side bus 106 may be combined on a motherboard 101. In addition, other components such as, the main memory 108 and/or the super I/O controller 122 may be included on the motherboard 101.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116 and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

FIG. 2 shows a flow chart illustrating an embodiment of a method 138 for configuring a replacement motherboard 101. The method begins at block 140 when a replacement motherboard 101 is installed into the IHS 100 and the IHS 100 is turned on for the first time and enters the basic input/output system (BIOS) power-on self-test (POST). In an embodiment, the method 138 may begin at block 140 every time the IHS 100 is turned on after a replacement motherboard 101 has been installed and may continue until the motherboard 101 has been configured. The method 138 then proceeds to decision block 142 where the method 138 determines whether the replacement motherboard 101 is in a manufacturing mode allowing modifications to configuration settings on the motherboard 101. If the replacement motherboard 101 is not in a manufacturing mode, the method 138 proceeds to block 144 where the IHS 100 conducts a normal boot process and then the method 138 ends at block 146. If the replacement motherboard 101 is in a manufacturing mode, the method then proceeds to decision block 148 where the method 138 determines whether firmware for the replacement motherboard is unlocked and capable of receiving configuration information. If the firmware is not unlocked, the method proceeds to block 144 where the IHS 100 conducts a normal boot process and then the method 138 ends at block 146. If the firmware is unlocked, the method proceeds to block 150 where the method 138 displays a menu (e.g., the menu of FIG. 3, described further below) on the display device 112, allowing the user to know the required input and available configuration selection options. The method 138 then proceeds to block 152 where the method 138 receives an input selection (e.g., one of the configuration options displayed in block 150) from the user via a user input device 124. In an embodiment, the user will know what configuration option to input by reading a configuration option such as, a sticker affixed to a chassis of the IHS 100 indicating the original motherboard configuration option. The method 138 then proceeds to block 154 where the IHS 100 configures the motherboard 101 using the input configuration option from block 152 and looking-up the configuration parameters relating to the input configuration option. The method 138 then proceeds to block 156 where the firmware is locked (e.g., using a one-shot) so that the firmware configuration cannot be changed again. The method 138 then proceeds to block 158 where the replacement motherboard 101 exits the manufacturing mode and enters the operation mode. After receiving and configuring the replacement motherboard 101, the method 138 proceeds to block 160 where the IHS is rebooted to allow the configuration of the replacement motherboard 101 to take effect. In an embodiment, the method 138 may or may not need to reboot the IHS 100 for the configuration to take effect. The method 138 ends at block 146.

FIG. 3 is a screenshot of an embodiment of a configuration menu 168 to facilitate configuration of a replacement motherboard 101. In an embodiment, the configuration menu 168 includes instructions 170. The instructions 170 may include information to be displayed (e.g., in block 150) to instruct a user about what is needed to configure the motherboard 101. The configuration menu 168 includes a plurality of configuration options such as, AMT_DASH_VPRO (set as default) 172, ASF 174, MANAGEABILITY ENGINE (ME) DISABLED 176, and/or AMT_DASH_VPRO; NO_TLS (NOT FOR USA) 178. However, one having ordinary skill in the art should readily understand that other configurations for the motherboard 101 may be displayed on the menu 168. A selection filed 180 may instruct the user to enter a number corresponding with a preferred configuration for the replacement motherboard 101. As discussed above, in an embodiment, a factory configuration for the motherboard 101 may be provided to the user visually such as, by placing a sticker on a chassis member for the IHS 100 that displays the configuration number corresponding with one of the configuration options 172, 174, 176 and/or 178. In another embodiment, the configuration number may be provided to the user in other ways. The selection field 180 allows the user to enter the configuration number, such as in block 152, that can be interpreted by the IHS 100 and used to configure the replacement motherboard 101. After a user enters a configuration number in the selection field 180, the continue field 182 prompts the user to ensure the selection entered in the selection field 180 is correct and then inform the IHS 100 that the user is ready to proceed with the configuration of the replacement motherboard such as, in block 154. After configuration of the replacement motherboard 101, a completion notice 184 may be displayed informing the user that the configuration of the replacement motherboard 101 is complete. In an embodiment, the completion notice 184 may include a notice that the IHS 100 may need to be re-booted before the configuration of the replacement motherboard 101 takes effect.

In an embodiment, the present disclosure implements a "Service Menu" (e.g., the configuration menu 168) that is invoked when a replacement motherboard 101 is first booted at the customer or IHS user site. When the BIOS, in an embodiment, detects that 1) the IHS 100 and/or the replacement motherboard 101 is in manufacturing mode, and 2) detects that firmware (e.g., the Intel® active management technology (AMT) configuration has not been locked down, then it presumes this is the first boot of a replacement motherboard 101 at a user site. Upon this detection, the BIOS prohibits booting to all other media and displays a "Service Menu" (e.g., the configuration menu 168) to the user. This "Service Menu" may list all of the factory available configuration options (e.g., skus) and allows the user to select the sku that matches that of the original motherboard. In an embodiment, an IHS 100 may streamline the sku selection by including a sticker in the chassis indicating the correct sku for the user's convenience. However, a sticker on the IHS 100 chassis is not the only way to communicate the configuration information to the user. The "Service Menu" may be a one-shot mechanism where the user configuration is locked down after the configuration selection is received by the IHS 100. As such, this lock down may mimic a lock down at the end of a factory process for manufacturing the IHS 100. In an embodiment, this solution may be fully contained in the system BIOS and require no other media to implement and will thus, not require CDs or other media to be sent to the user.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A configuration system to configure a replacement motherboard, the system comprising one or more subsystems to:
   detect a power-on of an information handling system (IHS) that includes a replacement motherboard;
   determine, in response to detecting the power-on of the IHS, that an initial boot of the replacement motherboard is occurring in response to detecting that the replacement motherboard is in a manufacturing mode and that firmware for the replacement motherboard is unlocked;
   automatically provide, in response to determining that the initial boot of the replacement motherboard is occurring, a menu including a plurality of available configurations that are retrieved from the replacement motherboard and an instruction to retrieve an original motherboard configuration;
   receive a selection of the original motherboard configuration from the plurality of available configurations for the replacement motherboard; and configure the replacement motherboard using the original motherboard configuration;
   wherein the one or more subsystems is executed on a processor in the IHS.

2. The system of claim 1, wherein the one or more subsystems receive the selection of the original motherboard configuration for the replacement motherboard during a basic input/output system (BIOS) operation.

3. The system of claim 1, wherein the original motherboard configuration includes a code number relating to a configuration of an original motherboard that is being replaced by the replacement motherboard.

4. The system of claim 1, wherein the configuration system is fully contained in a Basic Input/Output System in the IHS.

5. The system of claim 1, further comprising one or more subsystems to:
   lock the firmware for the replacement motherboard such that the firmware cannot be unlocked after the replacement motherboard has been configured.

6. The system of claim 1, wherein the original motherboard configuration enables or disables encryption on the replacement motherboard.

7. The system of claim 1, wherein the configuring the replacement motherboard using the original motherboard configuration is performed in response to a reboot of the IHS.

8. An information handling system (IHS) comprising:
   a processor;
   a replacement motherboard; and
   a configuration system coupled to the processor and the replacement motherboard, wherein the configuration system is operable to:
   detect a power-on of the IHS;
   determine, in response to detecting the power-on of the IHS, that an initial boot of the replacement motherboard is occurring in response to detecting that the replacement motherboard is in a manufacturing mode and that firmware for the replacement motherboard is unlocked;
   automatically provide, in response to determining that the initial boot of the replacement motherboard is occurring, a menu including a plurality of available configurations that are retrieved from the replacement motherboard and an instruction to retrieve an original motherboard configuration;
   receive a selection of the original motherboard configuration from the plurality of available configurations for the replacement motherboard; and
   configure the replacement motherboard using the original motherboard configuration.

9. The IHS of claim 8, wherein the configuration system receives the selection of the original motherboard configuration for the replacement motherboard during a basic input/output system (BIOS) operation.

10. The IHS of claim 8, wherein the original motherboard configuration includes a code number relating to a configuration of an original motherboard that is being replaced by the replacement motherboard.

11. The IHS of claim 8, wherein the configuration system is full contained in a Basic Input/Output System in the IHS.

12. The IHS of claim 8, wherein the configuration system is operable to:
   lock the firmware for the replacement motherboard such that the firmware cannot be unlocked after the replacement motherboard has been configured.

13. The IHS of claim 8, wherein the original motherboard configuration enables or disables encryption on the replacement motherboard.

14. The IHS of claim 8, wherein the configuring the replacement motherboard using the original motherboard configuration is performed in response to a reboot of the IHS.

15. A method to configure a replacement motherboard, the method comprising:
   detecting a power-on of an information handling system (IHS) that includes a replacement motherboard;
   determining, in response to detecting the power-on of the IHS, that an initial boot of the replacement motherboard is occurring in response to detecting that the replacement motherboard is in a manufacturing mode and that firmware for the replacement motherboard is unlocked;
   automatically providing, in response to determining that the initial boot of the replacement motherboard is occurring, a menu including a plurality of available configurations that are retrieved from the replacement motherboard and an instruction to retrieve an original motherboard configuration;
   receiving a selection of the original motherboard configuration from the plurality of available configurations for the replacement motherboard; and
   configuring the replacement motherboard using the original motherboard configuration.

16. The method of claim 15, wherein the receiving the selection of the original motherboard configuration is performed during a basic input/output system (BIOS) operation.

17. The method of claim 15, wherein the original motherboard configuration includes a code number relating to a configuration of an original motherboard that is being replaced by the replacement motherboard.

18. The method of claim 15, wherein the method is performed by a Basic Input/Output System (BIOS) of the IHS.

19. The method of claim 15, further comprising:
locking the firmware for the replacement motherboard such that the firmware cannot be unlocked after the replacement motherboard has been configured.

20. The method of claim 15, wherein the original motherboard configuration enables or disables encryption on the replacement motherboard.

21. A method for configuring a replacement motherboard comprising:
providing an information handling system (IHS) to a user, wherein the IHS includes an original motherboard;
providing a configuration stock keeping unit (SKU) to the user, wherein the SKU is related to a configuration of the original motherboard;
providing the user a replacement motherboard for the IHS;
detecting, by a basic input/output system (BIOS) in the IHS in response to a power-on of the IHS, that the replacement motherboard is installed in the IHS and an initial boot of the replacement motherboard is occurring in response to detecting that the replacement motherboard is in a manufacturing mode and that a firmware for the replacement motherboard is unlocked;
prohibiting booting of the IHS to media other than the BIOS;
automatically displaying, in response to detecting that the initial boot of the replacement motherboard is occurring, a service menu on the IHS, wherein the service menu displays a plurality of available configuration SKUs that are retrieved from the replacement motherboard and an instruction to retrieve the configuration SKU that is related to the configuration of the original motherboard;
receiving a selection of the configuration SKU that is related to the configuration of the original motherboard from the plurality of available configuration SKUs for the replacement motherboard; and
configuring the replacement motherboard using the configuration SKU that is related to the configuration of the original motherboard.

* * * * *